No. 704,409. Patented July 8, 1902.
H. E. WAY.
ORE TESTING TABLET.
(Application filed Feb. 7, 1901.)
(Specimens.)

WITNESSES:
James F. Duhamel
C. R. Ferguson

INVENTOR
Henry E. Way
BY Munn
ATTORNEYS

UNITED STATES PATENT OFFICE.

HENRY E. WAY, OF CUSTER, SOUTH DAKOTA, ASSIGNOR OF ONE-HALF TO HARRY B. GRIFFITH, OF CUSTER, SOUTH DAKOTA.

ORE-TESTING TABLET.

SPECIFICATION forming part of Letters Patent No. 704,409, dated July 8, 1902.

Application filed February 7, 1901. Serial No. 46,397. (Specimens.)

*To all whom it may concern:*

Be it known that I, HENRY E. WAY, a citizen of the United States, and a resident of Custer, in the county of Custer and State of South Dakota, have invented a new and Improved Ore-Testing Tablet, of which the following is a full, clear, and exact description.

This invention relates to improvements in ore-testing tablets; and the object is to provide a simple means by which miners, prospectors, and others may determine without special knowledge or skill and without the aid of delicate and expensive apparatus the presence in ores of metals having commercial value.

I will describe an ore-testing tablet embodying my invention and then point out the novel features in the appended claims.

Reference is to be had to the accompanying drawings, forming a part of this specification, in which similar characters of reference indicate corresponding parts in all the figures.

Figure 1:
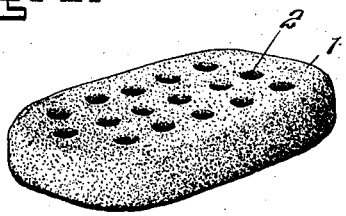
Figure 2:
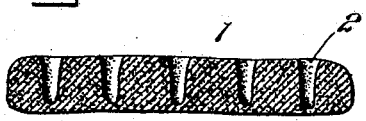
Figure 3:
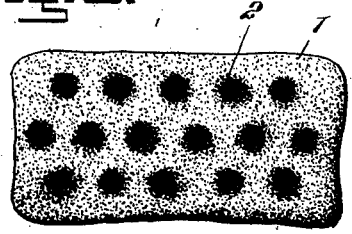

Fig. 1 is a perspective view of a tablet embodying my invention. Fig. 2 is a sectional view thereof, and Fig. 3 is a plan view.

In carrying out my invention I employ a tablet 1 of such material that it shall without the aid of any extraneous application of heat furnish by combustion a heat to reduce to the metallic state the metals contained in the ores to be tested and at the same time supply by the products of combustion the fluxes or reducing agents necessary for the reduction of the ores to a metallic state in which they can be readily recognized by the physical or chemical properties. In order to do this, I propose to make the tablets of such shape and size as to contain a sufficient quantity of the ores to be tested and to subject the same in the most thorough manner to the heat and reducing agents formed by the products of combustion.

The tablets 1 are composed of an equal volume of powdered charcoal and nitrate of potassium, or by weight sixteen parts of charcoal to twenty-seven parts of nitrate of potassium, together with sufficient flour paste or other adhesive to give them proper consistency, and in order to bring the ores into intimate contact with the reducing agents as the same are formed numerous deep depressions or recesses 2 are made in the body of the tablet and into which the powdered ores are sifted. By these proportions I obtain a very intense degree of heat, sufficient to reduce all of the more important ores. The reducing agents are formed by the products of combustion and being in nascent condition are most effective. Among these are carbonates and cyanids of potassium. The cyanid especially is a vigorous reducing agent and more so when in its nascent state. The carbonate assists in the formation of soluble silicates when the gangue rock is of a silicious character. The oxid of tin (cassiterite) can readily be reduced by the use of these tablets. This ore is generally difficult of reduction by carbonate of potassium, but readily yields under the action of cyanid thereof.

When the tablet is ignited, the metals contained in the ores are reduced to a finely-divided metallic condition and may be separated from the residue by trituration with water in a mortar, the soluble parts of the residue being dissolved by the water and the lighter carbon particles, &c., being washed off from the reduced metals on the principle of the operation known to miners as "panning."

In the case of gold, to isolate the same it is also advisable or necessary to dissolve by nitric acid the other metals that may be reduced, when the finely-divided gold may be flattened out by a pestle and rendered visible.

My tablets furnish a further means for testing for gold or silver. If one of these tablets be charged with ores of gold or silver and then burned and the burned residue dissolved in water, the ultimate effect is that the precious metals are first dissolved in the cyanid of potassium in much the same manner as they would be in the so-called "cyanid process," and both the cyanid and the carbonate of potassium being soluble are then dissolved in the water, leaving the metals in solution. The solution carrying the dissolved gold and silver is then filtered and evaporated and the residue ignited on another tablet, when the gold and silver are made visible by the method of trituration with water in a mortar, as aforesaid.

In the active combustion of the charcoal and the nitrate of potassium the carbon of the charcoal and the nitrogen of the nitrate of potassium form cyanogen and in turn cyanid of potassium, as is evidenced by the odor and chemical tests, as well as by the very effective reduction which this agent produces.

It is obvious that a tablet embodying my invention may be used by any unskilled person. It is portable, and a considerable supply may be carried easily in the pockets. Further, by its use a crucible or furnace is not required. It can be sold so cheaply that miners can afford to test rocks which may contain values, but which are not promising-looking enough for them to have assayed. The device can be used for almost any metal of commercial value, working well on gold, silver, copper, tin, lead, nickel, bismuth, &c. The tablet reduces the metals in small particles instead of fusing them into an alloy, as in other reduction methods, thus enabling several metals when present to be identified at one operation and dispensing with complex chemical operations.

In defining my invention with greater clearness I would state that I am aware that a slow-burning incense-tablet for use in church ceremonials has been devised, in which one part of saltpeter (nitrate of potassium) was mixed with ten parts of charcoal. This was not for reducing ores, but was intended to keep burning through the long ceremonials of the church, and the relative proportions used could have no metallurgical value, because of the insignificant proportion of nitrate potassium, which could neither give the requisite heat for the reduction of ores, nor produce the reducing agents necessary for the chemical reactions. For the purposes of my invention the nitrate of potassium must not be in smaller proportion by weight than the charcoal, as in the incense-tablet, but for the best results must be greatly in excess. The limits within which my invention is practicable is one part, by weight, of nitrate of potassium to one of charcoal as a minimum of the nitrate, to six parts, by weight, of the nitrate to one of charcoal. In other words, to produce the necessary reducing heat and reducing agents the nitrate must be at least equal to and preferably largely in excess of the charcoal, the preferred proportion being by weight twenty-seven of nitrate of potassium to sixteen of charcoal.

In carrying out my invention I do not confine myself to nitrate of potassium as the oxygen-furnishing agent for burning the charcoal or fuel element, but may use nitrates of sodium or ammonia, either alone or in combination with the nitrate of potassium. I have also found that potassium chlorate with the addition of a little cyanid of potassium furnishes approximate results in connection with the charcoal. I therefore do not confine myself to nitrate of potassium, but may employ an equivalent oxygen-furnishing reagent which will maintain the active combustion of the fuel and generate quickly the requisite reducing temperature and reducing agents.

Having thus described my invention, what I claim as new, and desire to secure by Letters Patent, is—

1. As a new article of manufacture, a composition tablet for testing ores comprising a fuel and a decomposable compound containing oxygen for burning said fuel, said oxygen-furnishing compound being employed in proportions sufficient to burn said fuel to produce a reducing heat and also furnish nascent reducing agents as described.

2. As a new article of manufacture, a composition tablet for testing ores comprising a fuel, and a decomposable compound containing oxygen for burning said fuel, said oxygen compound being in greater proportion by weight than the fuel as described.

3. As a new article of manufacture, a composition tablet for testing ores comprising charcoal and potassium nitrate, the potassium nitrate being in excess by weight.

4. As a new article of manufacture, a composition tablet for testing ores comprising a fuel and a decomposable compound supplying both oxygen for burning the fuel and cyanid of potassium for reducing the ores, substantially as described.

5. As a new article of manufacture, a composition tablet for testing ores comprising charcoal sixteen parts by weight, and nitrate of potassium twenty-seven parts by weight, substantially as described.

In testimony whereof I have signed my name to this specification in the presence of two subscribing witnesses.

HENRY E. WAY.

Witnesses:
S. C. LUMMIS,
HARRY B. GRIFFITH.